Patented Dec. 25, 1951

2,580,315

UNITED STATES PATENT OFFICE 2,580,315

EMULSION POLYMERIZATION PROCESS

Harold F. Park, East Longmeadow, Mass., assignor to Monsanto Chemical Company, St. Louis, Mo., a corporation of Delaware No Drawing. Application April 5, 1947,
Serial No. 739,653

2 Claims. (Cl. 260—93.5)

This invention relates to the emulsion polymerization of unsaturated polymerizable compounds. More particularly, it relates to the production of emulsions of polymers and copolymers of unsaturated polymerizable compounds which may be dried without coagulating the emulsions.

The polymerization and copolymerization of unsaturated polymerizable compounds in aqueous emulsions is known to have many advantages over mass polymerization procedures since the reaction may be more easily controlled and may be carried to completion more quickly. However, the conventional emulsions must be coagulated and the emulsifying agent and coagulant washed therefrom in order to obtain polymers and copolymers which are water resistant and which have good electrical properties.

An object of this invention is to provide a process for producing emulsion polymers and copolymers which may be dried without removal of the emulsifying agent.

A further object is to provide a new class of emulsifying agents for the polymerization and copolymerization of unsaturated polymerizable compounds in aqueous emulsion.

These and other objects are attained by polymerizing unsaturated polymerizable compounds in aqueous emulsion in the presence of emulsifiers comprising primary alkyl amine esters in which the alkyl groups may contain from 8 to 22 carbon atoms and the ester groups are derived from lower aliphatic organic acids.

The following examples are given by way of illustration and are not intended to limit the scope of this invention. Where parts are mentioned, they are parts by weight.

Example I 1000 parts of water were refluxed at atmospheric pressure for about 10 minutes to remove dissolved and occluded air. 2.5 parts of octadecylamine acetate emulsifying agent were added to the hot water. 500 parts of styrene monomer were then added slowly to the water and emulsifying agent over a period of about 1 hour while maintaining the solution at reflux at atmospheric pressure. Simultaneously with the addition of the styrene monomer, 25 parts of water containing 0.5 part of potassium persulfate were added gradually over a period of about 1 hour. After the styrene monomer and catalyst had been completely added to the reaction vessel, the reaction temperature was continued at reflux for about 30 minutes. During the entire process, the reaction mixture was gently agitated, care being taken to control the amount of agitation to prevent surface turbulence. The resulting emulsion was cooled and dried directly on a drum drier. A disc was compression molded from the polymer thus produced. It was then immersed in water at 75° C. for 24 hours and the amount of water absorbed determined as .012% based on the weight of polystyrene. The treated disc showed no dimensional change and very little whitening as a result of the water immersion. A similar disc made from a polymer which had been produced directly from an aqueous emulsion with the aid of sodium naphthalene sulfonate as emulsifying agent without removing the emulsifier by washing picked up nearly 33% more water and whitened considerably when subjected to the same immersion treatment.

Example II

To 125 parts of water in a glass-lined autoclave were added 0.25 part of octadecylamine acetate, 0.02 part of sulfur dioxide dissolved in water, .06 part of sodium bicarbonate, and 0.008 part of potassium persulfate. 100 parts of vinyl chloride monomer were then added and the autoclave was closed. The polymerization was carried out at 30° C. under constant agitation during a period of about 20 hours. The resulting emulsion was dried directly on drum driers and a sheet was compression molded from the polymer produced. The water absorption of the sheet when tested as shown in Example I was 0.56% based on the weight of the sheet. A similar sheet made from vinyl chloride emulsion polymerized in the presence of the sodium salt of naphthalene sulfonic acid as emulsifying agent, and from which the emulsifying agent had not been removed, had nearly 80% more water absorption.

Example III 93 parts of styrene monomer were mixed with 7 parts of fumaronitrile monomer and the mixture was added slowly with constant agitation over a period of 3 hours to 200 parts of water containing 0.2 part of octadecylamine acetate. Simultaneously 25 parts of water containing 0.04 part of potassium persulfate were added gradually to the reaction medium over the same extended period of time. The reaction was then continued for about an additional hour. The reaction ingredients were kept at reflux temperature at atmospheric pressure and were subjected to constant agitation throughout the reaction period and an emulsion of a copolymer of styrene and fumaronitrile was obtained which was then dried without coagulation on a drum drier to obtain a flaky resin. The resin was densified on malaxating rolls and then molded into a disc by compression molding methods. The disc showed a water absorption of about .15%. Using other emulsifying agents such as the sodium salt of mahogany acids and direct drying the emulsions without removing the emulsifier, the water absorption was nearly ⅓ higher.

*Example IV*

90 parts of vinyl chloride were copolymerized with 10 parts of diethyl maleate by a method similar to the one shown in Example II using 0.3 part of octadecylamine acetate, .009 part of potassium persulfate, .06 part of sodium bicarbonate, and 0.02 part of sulfur dioxide dissolved in water. The emulsion copolymer produced was direct dried and molded into a sheet. A water absorption of 0.6% was obtained compared with 1.2% for a similar copolymer made by the same process except using sodium alkyl naphthalene sulfonate as the emulsifying agent.

The emulsifying agents of this invention are primary alkyl amine esters in which the alkyl groups may contain from 8 to 22 carbon atoms and the ester group is derived from a lower aliphatic organic acid. Thus, the formates, acetates, propionates, butyrates, and valerates of primary alkyl amines such as octylamine, decyl amine, cetyl amine, capryl amine, octadecyl amine, docosanyl amine, etc., may be used. The amount of emulsifying agent to be used may be varied from about 0.1 to 0.5% or more based on the weight of the monomers to be polymerized. More than 0.5% may be used if desired, such larger amounts constituting an excess over the amount actually needed to produce a stable emulsion and requiring a coagulating step followed by a washing step to remove the excess emulsifying agent. Since an object of using the emulsifying agents of this invention is to produce polymer emulsions which may be dried without coagulating the emulsions, it is preferred to use amounts of emulsifying agents within the narrow range specified.

The emulsifying agents may be used in the aqueous emulsion polymerization of unsaturated compounds alone or in conjunction with other polymerizable materials. For example, vinyl compounds such as vinyl esters of organic or inorganic acids, vinyl ethers, vinyl ketones, vinyl aldehydes, vinyl amines, vinylidene compounds, acrylic and alpha substituted acrylic acid derivatives such as their esters, nitriles and amides, olefins, isolefins, diolefins, and allyl compounds may be polymerized alone or with each other by the process of this invention to provide polymer and copolymer emulsions which may be dried without coagulation to provide resins having exceptionally high resistance to water absorption. Further, the above polymerizable compounds may be copolymerized with one or more other polymerizable materials such as esters, nitriles, amides and other derivatives of maleic, fumaric, citraconic, mesaconic, itaconic, cinnamic, crotonic acid, etc. However, there are certain conditions which must be met to successfully polymerize unsaturated materials in aqueous emulsion, (1) the monomers must be substantially insoluble in water, i. e., not over 7%, (2) if a plurality of monomers is to be copolymerized, the monomers must be mutually compatible, (3) if a plurality of monomers is to be copolymerized and especially if one of the monomers is soluble in water up to about 7%, the monomers must be mixed together in the proportions desired in the copolymer prior to adding them to the emulsifying medium, and (4) the polymers and copolymers produced must be insoluble in water.

The polymers and copolymers made according to the process of this invention not only show superior resistance to water absorption but also show no deterioration in electrical properties such as is found if conventional emulsifying agents such as sodium salts of organic sulfonic acids are used as emulsifying agents to make an emulsion which is dried without removal of the emulsifying agent.

The processes of this invention may be carried out in the presence of the usual polymerization catalysts such as peroxides, perborates, persulfates, etc. If it is desired to produce an emulsion which may be direct dried without yielding inferior resins, the catalysts used must be taken from such peroxides, persulfates, perborates, etc. which have an oxidation-reduction potential of less than $-1.5$ and which are water-soluble and the amount used must be restricted to from about 0.005 to about 0.4 parts per 100 parts of monomer. Catalysts such as hydrogen peroxide, acetyl peroxide, sodium perborate, ammonium persulfate, etc. may be used in producing an emulsion which is to be direct dried. Such catalysts as benzoyl peroxide, lauroyl peroxide, di-(tertiary butyl) peroxide, etc. may only be used if the emulsion is to be coagulated and the resin washed.

A pH regulator such as sodium bicarbonate or buffer salts may be used for the monomers or monomer mixtures which require a limited pH range for successful polymerization. If a direct drying process is to be used, the amount of pH regulator must be kept within the range of 0.002 to 0.5 part per 100 parts of monomer.

Modifying agents such as mercaptans and other sulfur compounds may be included in the reaction medium if desired. If a direct drying process is to be used, the amount of modifying agent should be limited to the range of from about 0.025 to about 0.35 part per 100 parts of monomer.

The primary alkyl amine esters are efficient emulsifying agents for use in polymerizing unsaturated compounds in aqueous emulsions. They are essentially neutral in pH and have no adverse effect on polymers and copolymers. They are especially effective when it is desired to recover the resins from the emulsions by direct drying processes since they do not alter the moisture resistance and electrical properties of resins containing them.

The polymers and copolymers produced by the processes of this invention may be molded and fabricated by conventional methods. They may be compounded with conventional additives such as natural and synthetic resins, pigments, dyes, fillers and plasticizers.

Furthermore, the emulsions may be used directly for coating and impregnating purposes without drying them.

The processes of this invention provide a method for polymerizing unsaturated polymerizable materials in aqueous emulsions. They have the particular advantage that they provide a method which makes it possible to dry the emulsions produced without coagulating the resin and the polymers and copolymers thus produced have exceptional water and electrical resistance.

It is obvious that many variations may be made in the processes and products of this invention

What is claimed is:

1. A process which comprises polymerizing by heating to polymerization temperature 100 parts of styrene in a polymerization medium consisting of water, from 0.1 to 0.5 part of an emulsifying agent taken from the group consisting of primary alkyl amine esters in which the alkyl group contains from 8 to 22 carbon atoms and the ester group is a radical of a lower aliphatic acid containing from 1 to 5 carbon atoms, and from 0.005 to 0.4 part of a water-soluble polymerization catalyst having an oxidation-reduction potential of less than −1.5

2. A process as in claim 1 wherein the emulsifying agent is octadecylamine acetate and the catalyst is potassium persulfate.

HAROLD F. PARK.

REFERENCES CITED

The following references are of record in the file of this patent:

UNITED STATES PATENTS

| Number | Name | Date |
|---|---|---|
| 2,372,108 | Neher et al. | Mar. 20, 1945 |
| 2,404,817 | Strain | July 30, 1946 |
| 2,473,390 | Rose et al. | June 14, 1949 |